Jan. 19, 1960 — T. A. STIFFEL — 2,922,031
LIGHTING FIXTURE
Filed Feb. 21, 1957 — 2 Sheets-Sheet 1
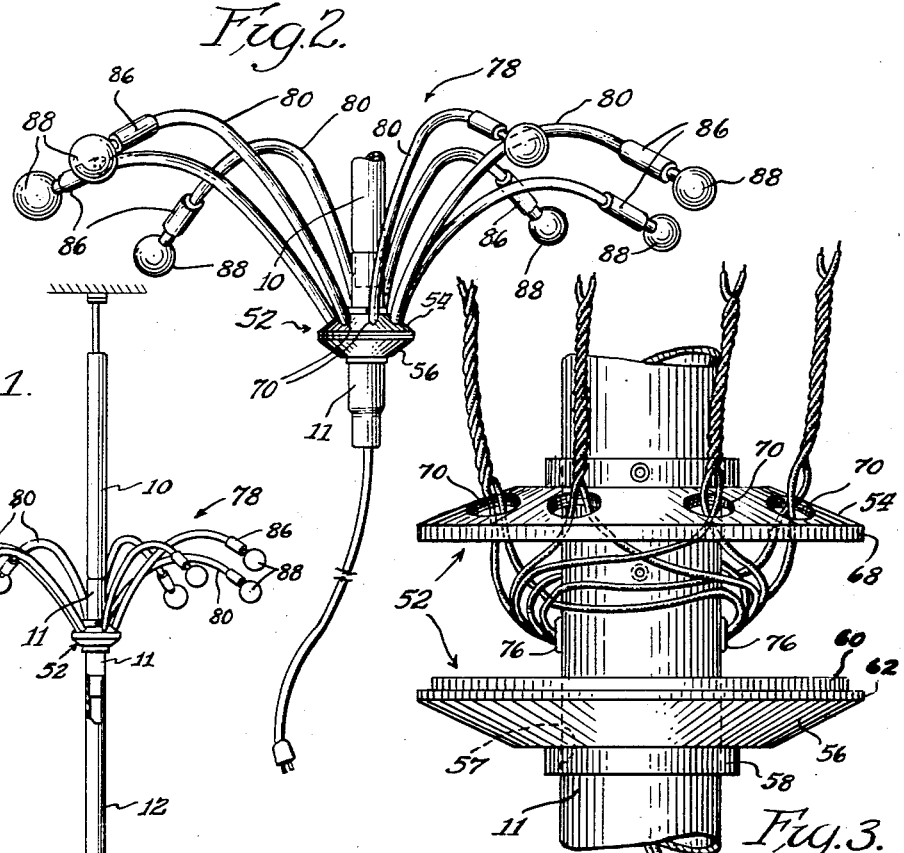
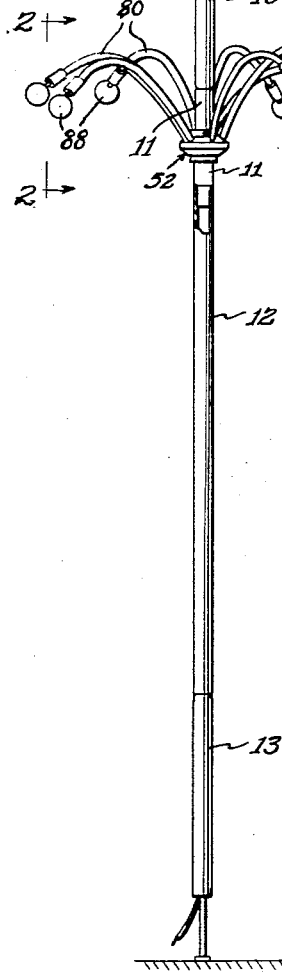
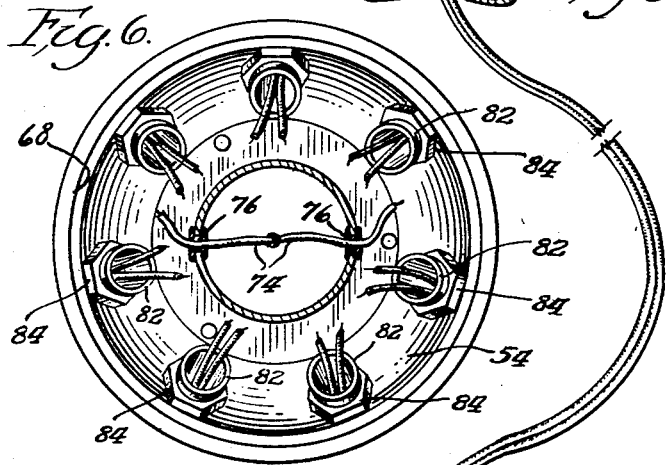
Inventor
Theophile A. Stiffel
By Max R. Kraus
Atty.

Jan. 19, 1960     T. A. STIFFEL     2,922,031
LIGHTING FIXTURE
Filed Feb. 21, 1957     2 Sheets-Sheet 2
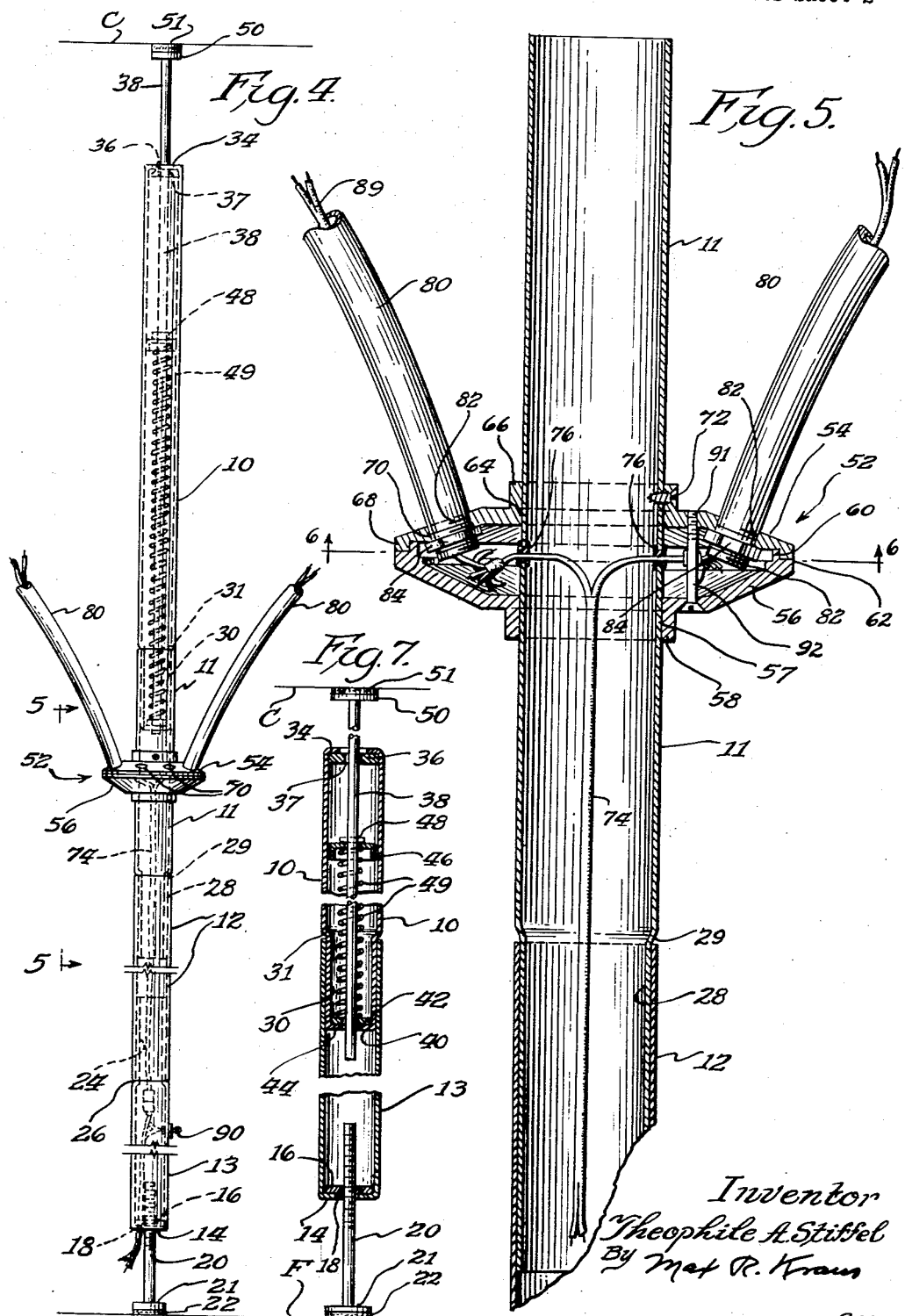
Inventor
Theophile A. Stiffel
By Max R. Kraus
Atty.

United States Patent Office 2,922,031
Patented Jan. 19, 1960

2,922,031

LIGHTING FIXTURE

Theophile A. Stiffel, Chicago, Ill.

Application February 21, 1957, Serial No. 641,535

1 Claim. (Cl. 240—81)

This invention relates to a lighting fixture.

This invention is an improvement on my Patent No. 2,793,286, issued May 21, 1957.

One of the objects of this invention is to provide a lighting fixture in the form of a pole made up of a plurality of sections which is supported under tension between the ceiling and floor of a room which pole supports a plurality of lighting fixtures.

Another object of this invention is to provide a bracket for securement to a pole of the foregoing character which bracket supports a cluster of arms or stems each of which supports a light bulb.

Another object of this invention is to provide a bracket formed of a pair of sections which may be readily attached to a supporting member which bracket supports a plurality of separate arms or stems each supporting a light bulb.

Another object is to provide a bracket of the foregoing character which may be mounted on a supporting pole and which supports a cluster of lights.

Other objects will become apparent as this description progresses.

In the drawings:

Fig. 1 is an elevational view showing the lighting fixture forming this invention.

Fig. 2 is an enlarged view showing the cluster of lights taken on lines 2—2 of Fig. 1.

Fig. 3 is an enlarged view showing the sections of the bracket supported on the tubular section of the post in disassembled position.

Fig. 4 is a view partially in section showing certain of the details.

Fig. 5 is an enlarged cross sectional view taken on lines 5—5 of Fig. 4.

Fig. 6 is a view taken on lines 6—6 of Fig. 5, and

Fig. 7 is a fragmentary sectional view showing the upper and lower sections of the pole.

As shown in Fig. 1 the supporting pole of the lighting fixture is formed of four tubular sections designated by the numerals 10, 11, 12 and 13 which are joined together, as will be described, for the purpose of providing a singular tubular pole. Due to the difference in ceiling heights it may be necessary to reduce the length of the pole, consequently one of the tubular sections, for example, section 12 may be eliminated and section 11 may then be secured to section 13, or if a longer tubular column is required additional sections similar to that of section 12 may be added.

As best shown in Fig. 7 the lower tubular section 13 has a circumferential flange 14 and supports a washer 16 which is secured thereto. The washer 16 has a threaded opening 18 which threadedly receives a threaded stem or leg 20, the outer end of which has secured to it a circular disc 21 provided with a felt or rubber covering 22. The leg member 20 is therefore adjustable with respect to the tubular section 13. The upper end of section 13 is open and is provided with a reduced circumferential portion 24 which nests into section 12 and is held in friction-tight fit therewith. A shoulder 26 on section 13 limits the nesting fit between section 13 and section 12.

The upper open end of section 12 is adapted to receive the reduced circumferential portion 28 of section 11 which is likewise provided with a shoulder 29. The upper open end of section 11 is adapted to receive the reduced circumferential portion 30 of section 10 in frictional-tight engagement. A shoulder 31 is provided on section 10.

The reduced circumferential portions 24 and 26 and their respective shoulders 26 and 29 are not shown in section but are similar to the reduced circumferential portion 30 and shoulder 31 and are secured in the same friction-tight engagement. As best shown in Fig. 7 the upper end of section 10 has a circumferential flange 34. A washer 36 is secured in the upper end of section 10 against said flange and said washer has a central opening 37 which slideably receives a rod 38 which extends into the tubular section 10. The opposite or lower end of section 10 has a circumferential flange 40 which supports a washer 42 which washer has an opening 44 in alignment with opening 37 and through which the rod 38 extends exteriorly of section 10.

Secured to the rod 38 inside section 10 is inverted cup shaped washer 46 and a pin 48. A coiled spring 49 is positioned inside said tubular section 10 surrounding said rod 38 and between the washer 46 secured to the rod and the washer 42 on section 10 and normally urges the rod 38 upwardly as shown in Figs. 1 and 7 or outwardly of said tubular section. The rod is prevented from being withdrawn outwardly of said tubular section by the pin 48.

Secured to the outer end of the rod is a disc 50 to which is secured a felt or rubber covering 51. When the sections 10, 11, 12 and 13 are joined together to form an integral part, as shown, the sections are frictionally held together as a unit, however, they may be disassembled if necessary. The unit as shown is supported vertically between the floor, designated by a letter F and the ceiling designated by the letter C and the rod 38 is urged upwardly of section 10 to rest against the ceiling and to hold the pole in a fixed position under tension or pressure against overturning or accidental dislodgement. The leg 20 is also adjustable by merely rotating same with respect to the lower tubular section 13, thus there is provided an adjustable lower leg and an upper member which is constantly under spring tension to rigidly and firmly support the pole in an upright position.

The lighting fixtures are secured preferably to tubular section 11 although it will be understood that they may be secured to the other sections if desired.

The bracket for supporting the cluster of lights is generally indicated at 52 and said bracket is formed of upper and lower ring like dish shaped sections 54 and 56 respectively which are joined together as will be described and form a hollow interior. The lower section 56 is generally dish shaped and is provided with a bottom circular opening 57 surrounded by a depending sleeve portion 58. The upper portion of section 56 is provided with a raised circumferential lip 60 and a shoulder 62.

The upper section 54 is generally inverted dish shaped and is provided with a central circular opening 64 surrounded by a sleeve portion 66. Section 54 has a circumferential depending portion 68 which engages with the lip 60 and shoulder 62 of the lower section 56, as best shown in Fig. 5. The upper section 54 is provided with a plurality of radially spaced circular openings 70 which are internally threaded to receive the stems of the lighting fixtures as will be shortly described.

The bracket 52 is secured to tubular section 11 of the post by slipping the upper section 54 thereon and securing it to the tubular section 11 by means of a fastening member 72 such as a screw which extends through an opening in the sleeve 66 of said bracket section. A plurality of such screws may be used.

The main electrical conducting wire 74 extends inside the tubular sections 11, 12 and 13 forming the post and through a pair of diametrically positioned openings 76 in the tubular section 11 and into the interior of the bracket 52.

The cluster of lights generally indicated at 78 is formed of a plurality of separate rigid tubular stems 80 bent to any preferred shape but preferably to the shape shown. Since all of the stems are alike only one of them will be described in detail. The inner end of stem 80 is threaded as at 82 and is in threaded engagement with the threaded opening 70 of upper section 54. The lower end of the threaded stem extends into the interior of the bracket 52 and is locked thereto by a threaded nut 84. Each of the tubular stems is secured in this manner. The outer end of the stem 80 supports an electrical socket 86 and a light bulb 88. Electrical conducting wires 89 extend inside the tubular stems for connection to the sockets and the opposite ends of said conducting wires are connected to the main conducting wires 74. The main conducting wires 74 are connected to a switch member 90 mounted on one of the lower tubular sections and lead out through an opening in the bottom of the lower section 13 for connection to a source of current supply.

The lower member 56 of the bracket 52 is slid on to the tubular section 11 and is attached to the upper member 54 by means of a threaded bolt 92 engaging the threaded opening 91 in the upper member 54. A number of such bolts may be used. Securement and detachment of the two sections of the bracket 62 is relatively simple.

It will be understood that various changes and modifications may be made from the foregoing without departing from the spirit and scope of the appended claim.

I claim:

In a bracket for attachment to a lighting fixture which is formed of a plurality of tubular sections secured together to form a continuous rigid pole; said bracket comprising an inverted dish shaped upper section and a lower dish shaped section, each said section having a central opening whereby said sections are positioned on said pole, said sections having complementarily shaped peripheral surfaces whereby said sections interfit without locking, one of said sections provided with a sleeve portion extending outwardly of said section, means passing through said sleeve portion and engaging said pole for securing said bracket to said pole, a threaded bolt engaging both said sections and extending vertically inside said sections for securing said sections together, said upper section having a plurality of spaced threaded openings, an arm threadedly secured in each said opening and extending upwardly of said upper section with the outer end of each arm adapted to support a light bulb, and said arms being arched upwardly and outwardly of said bracket.

References Cited in the file of this patent

UNITED STATES PATENTS

| | | |
|---|---|---|
| 1,408,128 | Neahr | Feb. 28, 1922 |
| 1,732,208 | Wirth | Oct. 15, 1929 |
| 1,831,402 | Witz | Nov. 10, 1931 |
| 2,136,369 | Belcher | Nov. 15, 1938 |
| 2,793,286 | Stiffel | May 21, 1957 |